(12) United States Patent
Andrew

(10) Patent No.: US 7,197,190 B1
(45) Date of Patent: Mar. 27, 2007

(54) METHOD FOR DIGITAL DATA COMPRESSION

(75) Inventor: James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,770

(22) Filed: Sep. 29, 1998

(30) Foreign Application Priority Data

Sep. 29, 1997 (AU) .................................. PO9510
Dec. 8, 1997 (AU) .................................. PP0776

(51) Int. Cl.
 *G06T 9/00* (2006.01)
 *G06K 9/46* (2006.01)

(52) U.S. Cl. ...................... 382/240; 382/232; 382/233

(58) Field of Classification Search ........ 382/232–233, 382/236–240, 244–251; 358/426, 261.1, 358/261.2, 261.3, 427; 348/395.1, 397.1, 348/398.1, 403.1, 568; 708/200–203, 400; 341/51, 107
See application file for complete search history.

(56) References Cited

U.S. PATENT DOCUMENTS

| | | | | |
|---|---|---|---|---|
| 4,698,689 A | * | 10/1987 | Tzou | 358/433 |
| 5,515,377 A | * | 5/1996 | Horne et al. | 370/395.64 |
| 5,867,602 A | | 2/1999 | Zandi et al. | 382/248 |
| 5,881,173 A | | 3/1999 | Ohmori | 382/232 |
| 6,141,446 A | * | 10/2000 | Boliek et al. | 382/233 |

FOREIGN PATENT DOCUMENTS

| EP | 517141 A2 | * | 12/1992 |
|---|---|---|---|
| EP | 634871 A2 | * | 1/1995 |
| EP | 855838 A2 | | 7/1998 |

OTHER PUBLICATIONS

Bruce et al., "Wavelet Analysis", IEEE Spectrum, Oct. 1996, pp. 26-35.
Hanan Samet, "The Quadtree and Related Hierarchical Data Structures", ACM Computing Surveys, vol. 16, No. 2, Jun. 1984, pp. 187-260.
Eric J. Stollnitz et al., "Wavelets for Computer Graphics: A Primer, Part 1", IEEE Computer Graphics and Applications, May 1995, pp. 76-84.
Eric J. Stollnitz et al., "Wavelets for Computer Graphics: A Primer, Part 2", IEEE Computer Graphics and Applications, Jul. 1995, 75-85.
David Scott Taubman, "Directionality and Scalability in Image and Video Compression," University of California at Berkeley, 1994.

* cited by examiner

*Primary Examiner*—Duy M. Dang
(74) *Attorney, Agent, or Firm*—Fitzpatrick, Cella, Harper & Scinto

(57) ABSTRACT

A method of compressing data is disclosed including applying a transform to the data to produce transformed data having a series of parts; entropy encoding the magnitude of the transformed data of at least one of said parts; and separately encoding the value of said transformed data. Preferably said entropy encoding utilizes the number of non-zero coefficients surrounding a spatial location of a corresponding transformed data value and the entropy encoding can include encoding the number of leading zeros in transformed data values. The method further includes quantizing transformed portions of said data to integer values including a sign bit and a predetermined number of coefficient bits. Ideally, the preferred embodiment includes wavelet transforming the data with each of the sub-band components of the wavelet transform being separately entropy encoded. The present invention is ideally suited to the compression of image data.

52 Claims, 11 Drawing Sheets

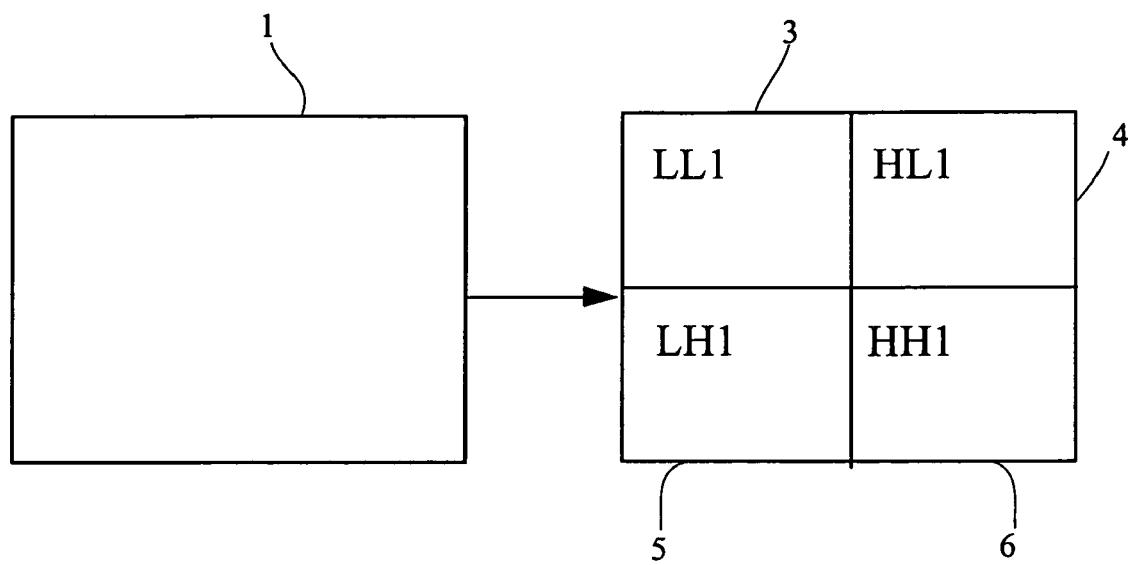
Fig. 1
Prior Art
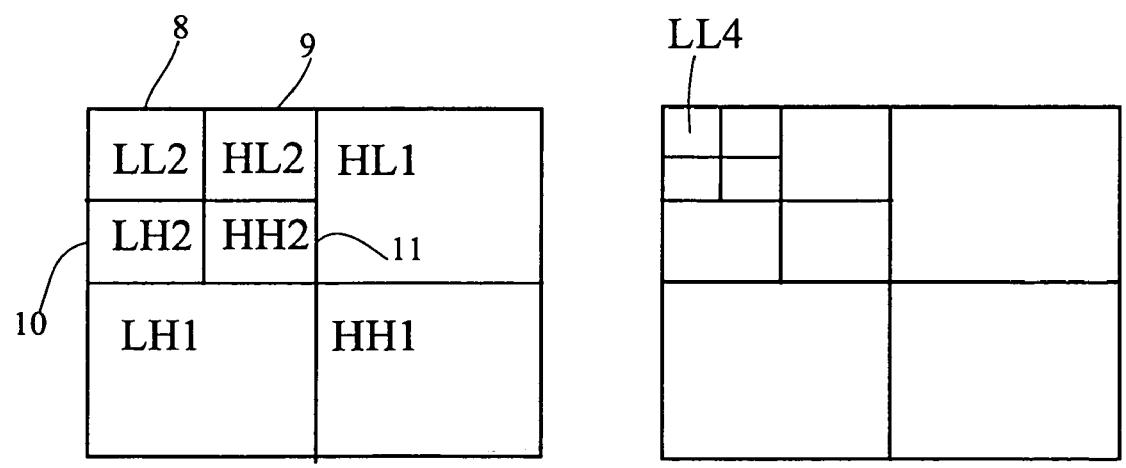
Fig. 2
Prior Art
Fig. 3

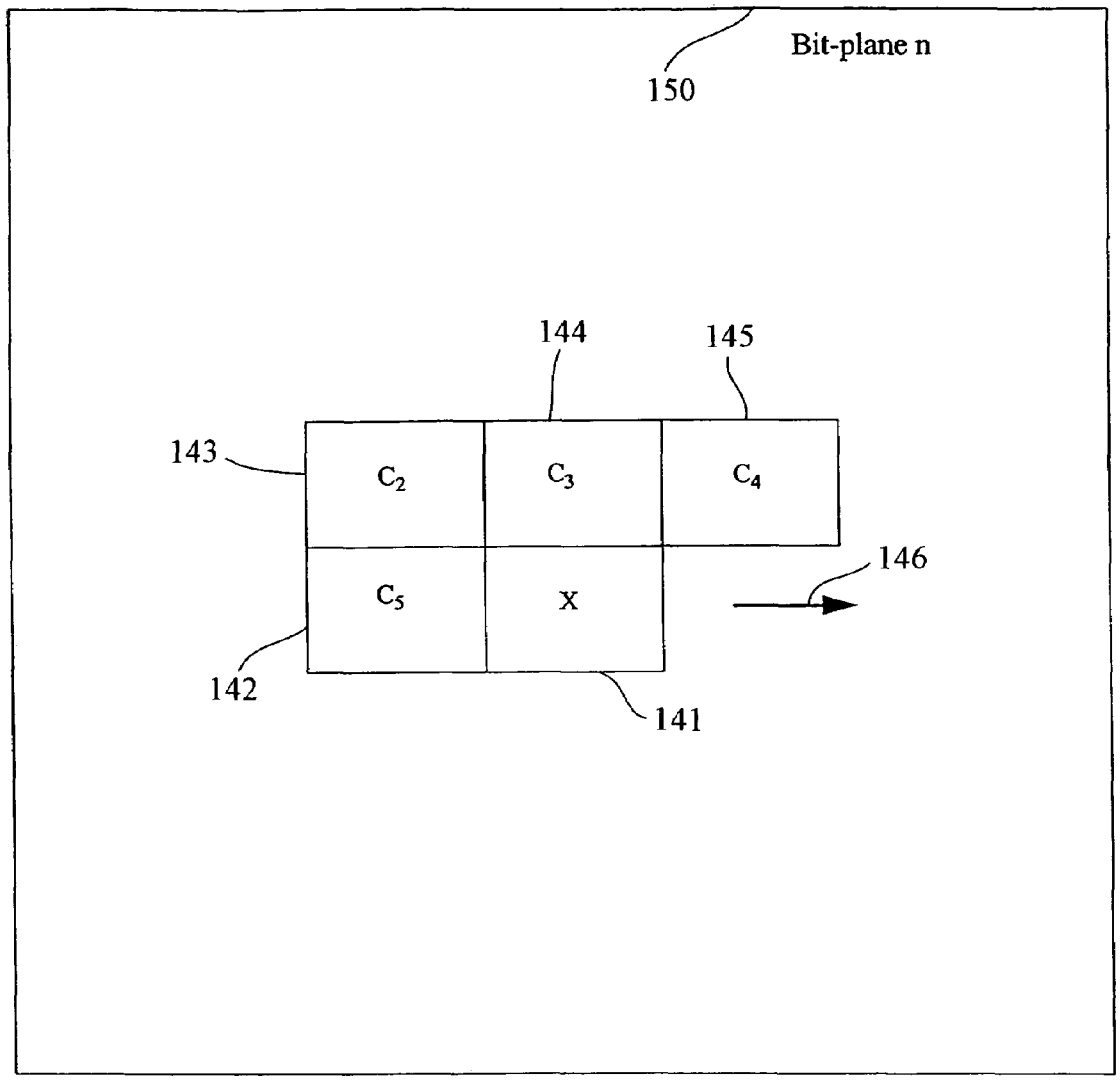

$C_0 = \begin{cases} 1 & \text{if a most significant bit of current coefficient has been encoded} \\ 0 & \text{if a most significant bit of current coefficient has not been encoded} \end{cases}$ $C_1 = \begin{cases} 1 & \text{if any one or more of surrounding coefficient's most significant bits have been coded} \\ 0 & \text{if none of surrounding coefficient's most significant bits have not been coded} \end{cases}$

Fig. 13

METHOD FOR DIGITAL DATA COMPRESSION

FIELD OF INVENTION

The present invention relates to the field of data compression with particular application to digital image compression. More particularly, the present invention discloses a digital image compression method using spatial magnitude context entropy coding of discrete wavelet transform coefficients.

BACKGROUND OF INVENTION

The field of digital data compression and in particular digital image compression has attracted great interest for some time.

In the field of digital image compression, many different techniques have been utilised. In particular, one popular technique is the JPEG standard which utilises the discrete cosine transform to transform standard size blocks of an image into corresponding cosine components. In this respect, the higher frequency cosine components are heavily quantised so as to assist in obtaining substantial compression factors. The heavy quantisation is an example of a "lossy" technique of image compression. The JPEG standard also provides for the subsequent lossless compression of the transformed coefficients.

Recently, the field of wavelet transforms has gained great attention as an alternative form of data compression. The wavelet transform has been found to be highly suitable in representing data having discontinuities such as sharp edges. Such discontinuities are often present in image data or the like.

Although the preferred embodiments of the present invention will be described with reference to the compression of image data, it will be readily evident that the preferred embodiment is not limited thereto. For examples of the many different applications of Wavelet analysis to signals, reference is made to a survey article entitled "Wavelet Analysis" by Bruce et. al. appearing in IEEE Spectrum, October 1996 page 26–35. For a discussion of the different applications of wavelets in computer graphics, reference is made to "Wavelets for Computer Graphics", I. Stollinitz et. al. published 1996 by Morgan Kaufmann Publishers, Inc.

ASPECTS OF INVENTION

It is an object of the present invention to ameliorate one or more disadvantages of the prior art.

According to a first aspect of the present invention, there is provided a method of compressing data, the method including the steps of:

applying a transform to the data to produce transformed data having a series of parts;

entropy encoding the magnitude of the transformed data of at least one of said parts based on the magnitude of the surrounding transformed data; and separately encoding the value of said transformed data.

According to a second aspect of the present invention, there is provided a method of decompressing data, the method including the steps of entropy decoding a portion of the data to generate the magnitudes of transform data based on the magnitudes of surrounding, previously entropy decoded, transformed data; and separately decoding another portion of the data to generate the values of said transformed data; and applying an inverse transform to the transform data to generate decompressed data.

According to a third aspect of the present invention, there is provided an apparatus for compressing data, the apparatus including:

transform means for applying a transform to the data to produce transformed data having a series of parts;

entropy encoding means for entropy encoding the magnitude of the transformed data of at least one of said parts based on the magnitude of the surrounding transformed data; and encoding means for separately encoding the value of said transformed data.

According to a fourth aspect of the present invention, there is provided an apparatus for decompressing data, the apparatus including;

entropy decoder means for entropy decoding a portion of the data to generate the magnitudes of transform data based on the magnitudes of surrounding, previously entropy decoded, transformed data; and decoder means for separately decoding another portion of the data to generate the values of said transformed data; and inverse transform means for applying an inverse transform to the transform data to generate decompressed data.

According to a fifth aspect of the present invention, there is provided a computer program product including a computer readable medium having recorded thereon a computer program for compressing data, the computer program product including:

transform means for applying a transform to the data to produce transformed data having a series of parts;

entropy encoding means for entropy encoding the magnitude of the transformed data of at least one of said parts based on the magnitude of the surrounding transformed data; and encoding means for separately encoding the value of said transformed data.

According to a sixth aspect of the present invention, there is provided a computer program product including a computer readable medium having recorded thereon a computer program for decompressing data, the computer program product including:

entropy decoder means for entropy decoding a portion of the data to generate the magnitudes of transform data based on the magnitudes of surrounding, previously entropy decoded, transformed data; and decoder means for separately decoding another portion of the data to generate the values of said transformed data; and inverse transform means for applying an inverse transform to the transform data to generate decompressed data.

According to a seventh aspect of the present invention, there is provided a method of compressing data, the method including the steps of:

(a) applying a transform to the data to produce a plurality of transform coefficients, wherein each transform coefficient is expressible by a code representation including a plurality of symbols;

(b) entropy encoding one of said symbols, not previously entropy coded, of a current transform coefficient based on a context of surrounding symbols;

(c) repeating step (b) a predetermined number of times for the current transform coefficient; and (d) processing another transform coefficient in accordance with steps (b) and (c).

According to a eighth aspect of the present invention, there is provided a method of compressing data including the steps of:

a) applying a transform to the data to produce a plurality of transform coefficients, wherein each transform coefficient is expressible by a binary code representation having a plurality of bits;

b) entropy encoding one of said bits, not previously entropy coded, of a current transform coefficient based on a context of surrounding bits;

c) repeating step b) a predetermined number of times the current transform coefficient; and d) processing another transform coefficient in accordance with steps b) and c).

According to a ninth aspect of the present invention, there is provided a method of decompressing data, the method including the steps of:

(a) entropying decoding said data to generate a symbol of a current transform coefficient based on a context of surrounding symbols;

(b) repeating step (a) a predetermined number of times for the current transform;

(c) generating another transform coefficient in accordance with steps (a) and (b); and (d) applying an inverse transform to the transform coefficients to produce data.

According to a tenth aspect of the present invention, there is provided a method of decompressing data, the method including the steps of:

(a) entropying decoding said data to generate a bit of a current transform coefficient based on a context of surrounding bits;

(b) repeating step (a) a predetermined number of times for the current transform;

(c) generating another transform coefficient in accordance with steps (a) and (b)

(d) applying an inverse transform to the transform coefficients to produce data.

According to an eleventh aspect of the present invention, there is provided an apparatus for compressing data, the apparatus including:

transform means for applying a transform to the data to produce a plurality of transform coefficients, wherein each transform coefficient is expressible by a code representation including a plurality of symbols;

entropy encoder means for entropy encoding one of said symbols, not previously entropy coded, of a current transform coefficient based on a context of surrounding symbols;

repetition means for repeating the operations of the entropy encoder means a predetermined number of times for the current transform coefficient; and processor means for processing another transform coefficient in accordance with the operations of the entropy encoder means and repetition means.

According to a twelfth aspect of the present invention, there is provided an apparatus for compressing data including:

transform means for applying a transform to the data to produce a plurality of transform coefficients, wherein each transform coefficient is expressible by a binary code representation having a plurality of bits;

entropy encoder means for entropy encoding one of said bits, not previously entropy coded, of a current transform coefficient based on a context of surrounding bits;

repetition means for repeating the operation of the entropy encoder a predetermined number of times for the current transform coefficient; and processor means for processing another transform coefficient in accordance with the operations of the entropy encoder means and repetition means.

According to a thirteenth aspect of the present invention, there is provided an apparatus for decompressing data, the apparatus including:

entropy decoder means for entropying decoding said data to generate a symbol of a current transform coefficient based on a context of surrounding symbols;

repetition means for repeating the operation of the entropy decoder means a predetermined number of times for the current transform coefficient;

generation means for generating another transform coefficient in accordance with the operations of the entropy decoder means and the repetition means; and inverse transform means for applying an inverse transform to the transform coefficients to produce data.

According to a fourteenth aspect of the present invention, there is provided an apparatus for decompressing data, the apparatus including:

entropy decoder means for entropying decoding said data to generate a bit of a current transform coefficient based on a context of surrounding bits;

repetition means for repeating the operation of the entropy decoder means a predetermined number of times for the current transform coefficient;

generation means for generating another transform coefficient in accordance with the operations of the entropy decoder means and the repetition means; and inverse transform means for applying an inverse transform to the transform coefficients to produce data.

According to a fifteenth aspect of the present invention, there is provided a computer program product including a computer readable medium having recorded thereon a computer program for compressing data, the computer program product including:

transform means for applying a transform to the data to produce a plurality of transform coefficients, wherein each transform coefficient is expressible by a code representation including a plurality of symbols;

entropy encoder means for entropy encoding one of said symbols, not previously entropy coded, of a current transform coefficient based on a context of surrounding symbols; and repetition means for repeating the operations of the entropy encoder means a predetermined number of times for the current transform coefficient; and processor means for processing another transform coefficient in accordance with the operations of the entropy encoder means and repetition means.

According to a sixteenth aspect of the present invention, there is provided a computer program product including a computer readable medium having recorded thereon a computer program for compressing data, the computer program product including:

transform means for applying a transform to the data to produce a plurality of transform coefficients, wherein each transform coefficient is expressible by a binary code representation having a plurality of bits;

entropy encoder means for entropy encoding one of said bits, not previously entropy coded, of a current transform coefficient based on a context of surrounding bits;

repetition means for repeating the operation of the entropy encoder a predetermined number of times the current transform coefficient; and processor means for processing another transform coefficient in accordance with the operations of the entropy encoder means and repetition means.

According to a seventeenth aspect of the present invention, there is provided a computer program product including a computer readable medium having recorded thereon a computer program for decompressing data, the computer program product including:

entropy decoder means for entropying decoding said data to generate a symbol of a current transform coefficient based on a context of surrounding symbols;

repetition means for repeating the operation of the entropy decoder means a predetermined number of times for the current transform coefficient;

generation means for generating another transform coefficient in accordance with the operations of the entropy decoder means and the repetition means; and inverse transform means for applying an inverse transform to the transform coefficients to produce data.

According to an eighteenth aspect of the present invention, there is provided a computer program product including a computer readable medium having recorded thereon a computer program for decompressing data, the computer program product including:

entropy decoder means for entropying decoding said data to generate a bit of a current transform coefficient based on a context of surrounding bits;

repetition means for repeating the operation of the entropy decoder means a predetermined number of times for the current transform coefficient;

generation means for generating another transform coefficient in accordance with the operations of the entropy decoder means and the repetition means; and inverse transform means for applying an inverse transform to the transform coefficients to produce data.

BRIEF DESCRIPTION OF THE DRAWINGS

Embodiments of the invention are described, by way of example only, with reference to the drawings, in which:

FIGS. 1–3 illustrate the process of wavelet transforming image data;

FIG. 13 illustrates the process of utilising surrounding context for a current coefficient at bitplane n;

DETAILED DESCRIPTION

Figure 4:
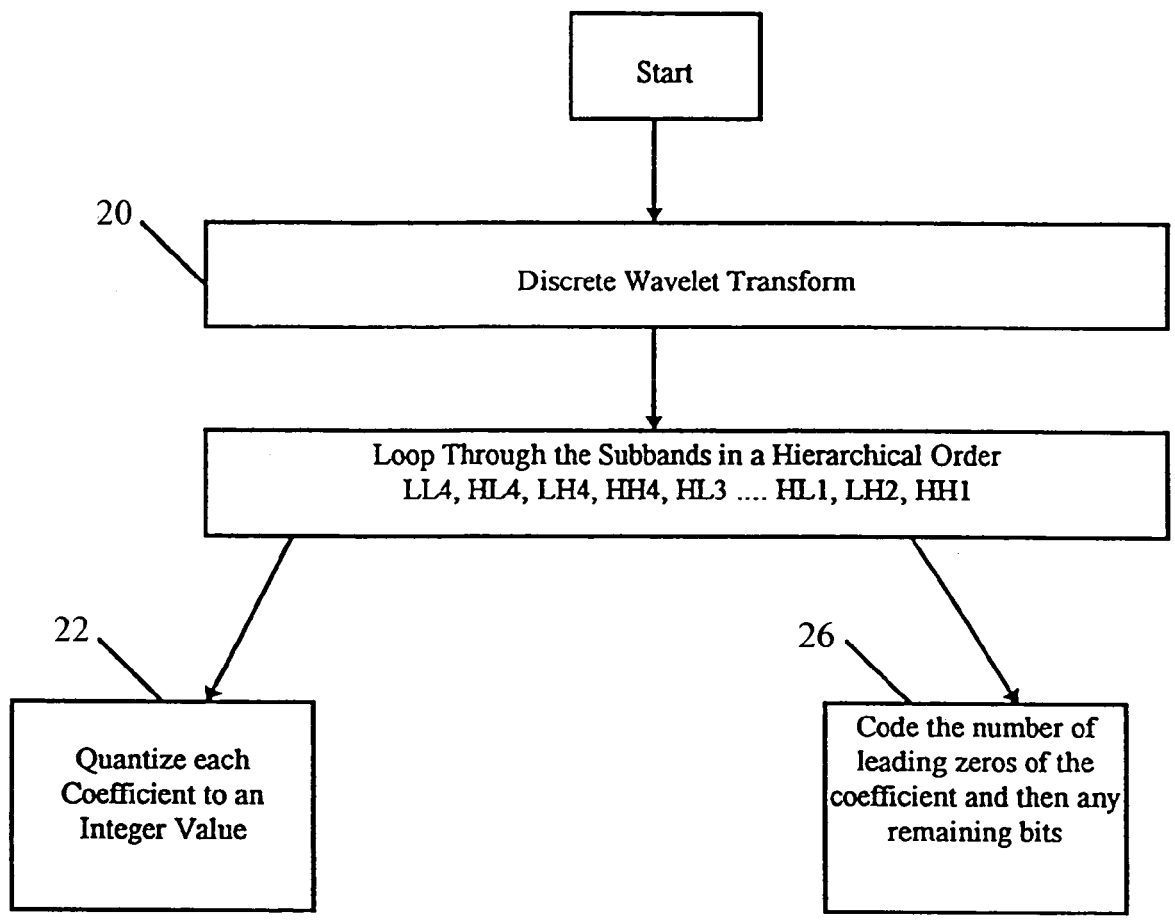
FIG. 4 illustrates the steps involved in the encoder of the first preferred embodiment.

The preferred embodiments proceed initially by means of a wavelet transform of image data. A description of the wavelet transform process is given in many standard texts and in particular the aforementioned book by Stollnitz et. al. Before proceeding with a description of the preferred embodiments, a brief overview of the wavelet process will now be described with reference to the accompanying drawings.

Referring initially to FIG. 1, an original image 1 is transformed utilising a Discrete Wavelet Transform (DWT) into four subimages 3–6. The subimages or subbands are normally denoted LL1, HL1, LH1 and HH1. The one suffix on the subband names indicates level 1. The LL1 subband is a low pass decimated version of the original image.

The wavelet transform utilised can vary and can include, for example, Haar basis functions, Daubechies basis functions etc. The LL1 subband is then in turn utilised and a second Discrete Wavelet Transform is applied as shown in FIG. 2 giving subbands LL2 (8), HL2 (9), LH2 (10), HH2 (11). This process is continued for example as illustrated in FIG. 3 wherein the LL4 subband is illustrated, the LL4 band decomposition process being referred to as an octave band filter bank with the LL4 subband being referred to as the DC subband. Obviously, further levels of decomposition can be provided depending on the size of the input image.

Each single level DWT can in turn be inverted to obtain the original image. Thus a J-level DWT can be inverted as a series of J-single level inverse DWT's.

To code an image hierarchically the DC subband is coded first. Then, the remaining subbands are coded in order of decreasing level. That is for a 4 level DWT, the subbands at level 4 are coded after the DC subband (LL4). That is the HL4, LH4 and HH4 subbands. The subbands at level 3 (HL3, LH3, and HH3) are then coded, followed by those at level 2 (HL2, LH2 and HH2) and then level 1 (HL1, LH1 and HH1).

With standard images, the encoded subbands normally contain the "detail" information in an image. Hence, they often include a sparse array of values and substantial compression can be achieved by quantisation of the subbands and efficient encoding of their sparse matrix form.

1.0 First Preferred Embodiment

In the first preferred embodiment, an effective compression of the subbands is provided through the utilisation of the correlation between the energy of adjacent coefficients in the DWT subband.

The encoding proceeds via two stages. The first stage encodes the leading zeros, or magnitude category of each DWT coefficient, based on the context of the number of surrounding coefficients that are not quantised to zero. By using a limited window this number takes on a relatively small range of values, and hence there are a limited number of contexts. For efficient entropy coding such a small number of contexts is desired. After the number of leading zero is transmitted or encoded the remaining bits for coefficients that are not quantised to zero are transmitted or encoded as is. Entropy coding could also be used at this stage. However, experiments suggest that this may not substantially increase the compression, while introducing more complexity.

Figure 5:
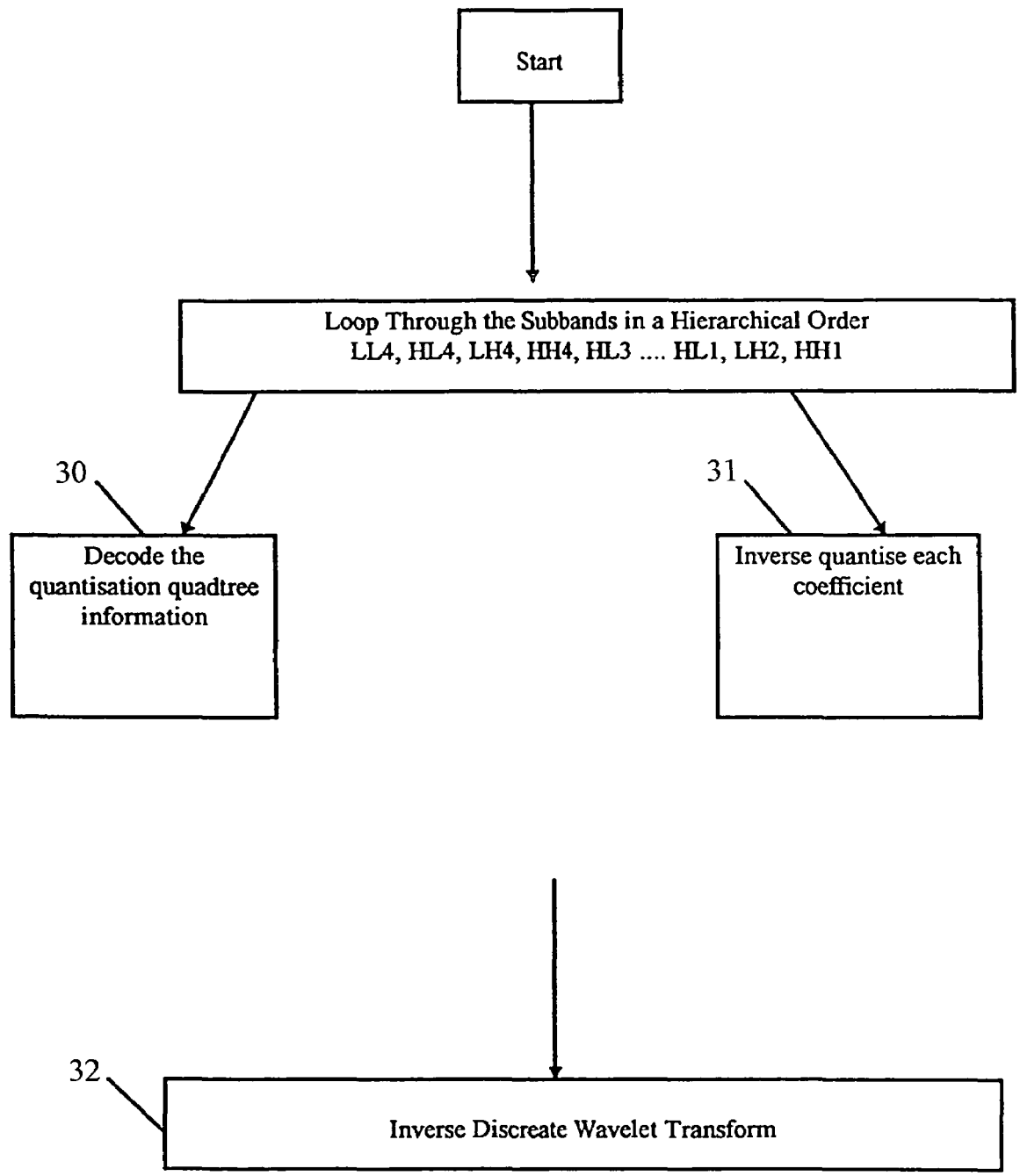
FIG. 5 illustrates the steps in the decoder as constructed in accordance with the first preferred embodiment.

An overview of the coding process is illustrated 20 in FIG. 4, while the decoding process is illustrated 30 in FIG. 5.

Figure 6:
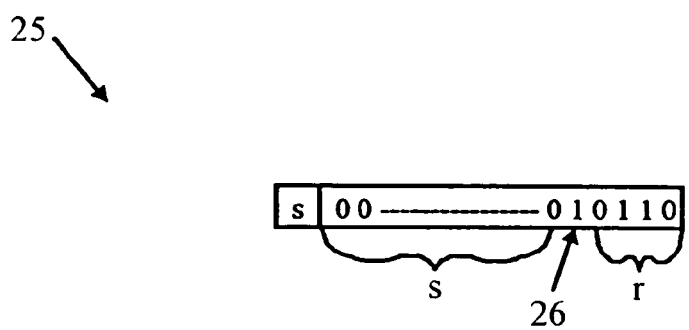
FIG. 6 illustrates a data structure utilised by the first preferred embodiment.

Turning initially to FIG. 4, a digital image is transformed 21 using a Discrete Wavelet Transform into several subband components as previously described. Each subband is preferably coded in a hierarchical order. As illustrated in FIG. 6, each coefficient in a subband is quantised to an integer value 25 having a predetermined number of bits L, and conceptually represented in a binary format with a sign bit s. This integer is represented using the number of leading zeros Z from a predetermined maximum bit number and the remaining bits r with a sign bit. This number of leading zeros Z is entropy coded based on the number of surrounding coefficients within a certain window that are not quantised to zero. For non zero integer coefficients the remaining bits r and sign bit s are coded as is.

As illustrated in FIG. 5, at the decoder the operation of the encoder is reversed (in as much as this is possible with quantisation). The quantised coefficients are inverse quantised 31. Finally an inverse Discrete Wavelet Transform is performed 32 on the resulting subbands to give the output image.

As noted previously, in the encoding process the discrete wavelet transform coefficients are quantised 22 to integer values. Let c represent a coefficient value and d its quantised values. Then the quantisation is performed as, $$d = \text{fix}\left(\frac{c}{q}\right)$$

where q is a predetermined quantisation factor and fix is defined by, $$\text{fix}(x) = \begin{cases} \lfloor x \rfloor & x \geq 0 \\ \lceil x \rceil & x \leq 0 \end{cases}$$

were $\lfloor \ \rfloor$ is the round down to nearest integer operator and $\lceil \ \rceil$ is the round up to nearest integer operator. At the encoder each coefficient in a subband is quantised to an integer value using this equation.

The inverse quantisation is given by, $$c = q \times d + \text{sign}(d) \times \frac{q}{2}$$

where, $$\text{sign}(d) = \begin{cases} -1 & d \leq 0 \\ 0 & d = 0 \\ 1 & d \geq 0 \end{cases}$$

At the decoder each coefficient is inverse quantised using this inverse quantisation equation. The quantisation factor q can vary from subband to subband, or it can be fixed for the whole image. It can be coded in the header of the compressed image.

1.1 Coefficient Coding and Decoding

As shown in FIG. 6, each quantised coefficient is an integer value represented in a binary format with a sign bit. For the purpose of the description of the preferred embodiment, it is assumed with 15 bits and an extra sign bit (ie. L=16)). Thus $$d = \text{sign}(d) \times b_{14} b_{13} \ldots b_0$$

where $b_n$ is, binary bit n. If the coefficient is non zero and the most significant bit number 26 is m, then:

$$b_{14} = b_{13} = \ldots = b_{m+1} + 0, b_m = 1,$$

and the number of leading zeros Z is, $$Z = 14 - m,$$

If the coefficient is zero we set Z=15. The coefficient d is coded in two parts. First Z is entropy coded based on the context of the number of surrounding coefficients that are non-zero. A concise definition of surrounding coefficients is given below. Then for non-zero coefficients bits $b_{m-1}, \ldots, b_0$ and the sign bit are coded into the bit stream.

1.2 Surrounding Coefficient Context

Figure 7:
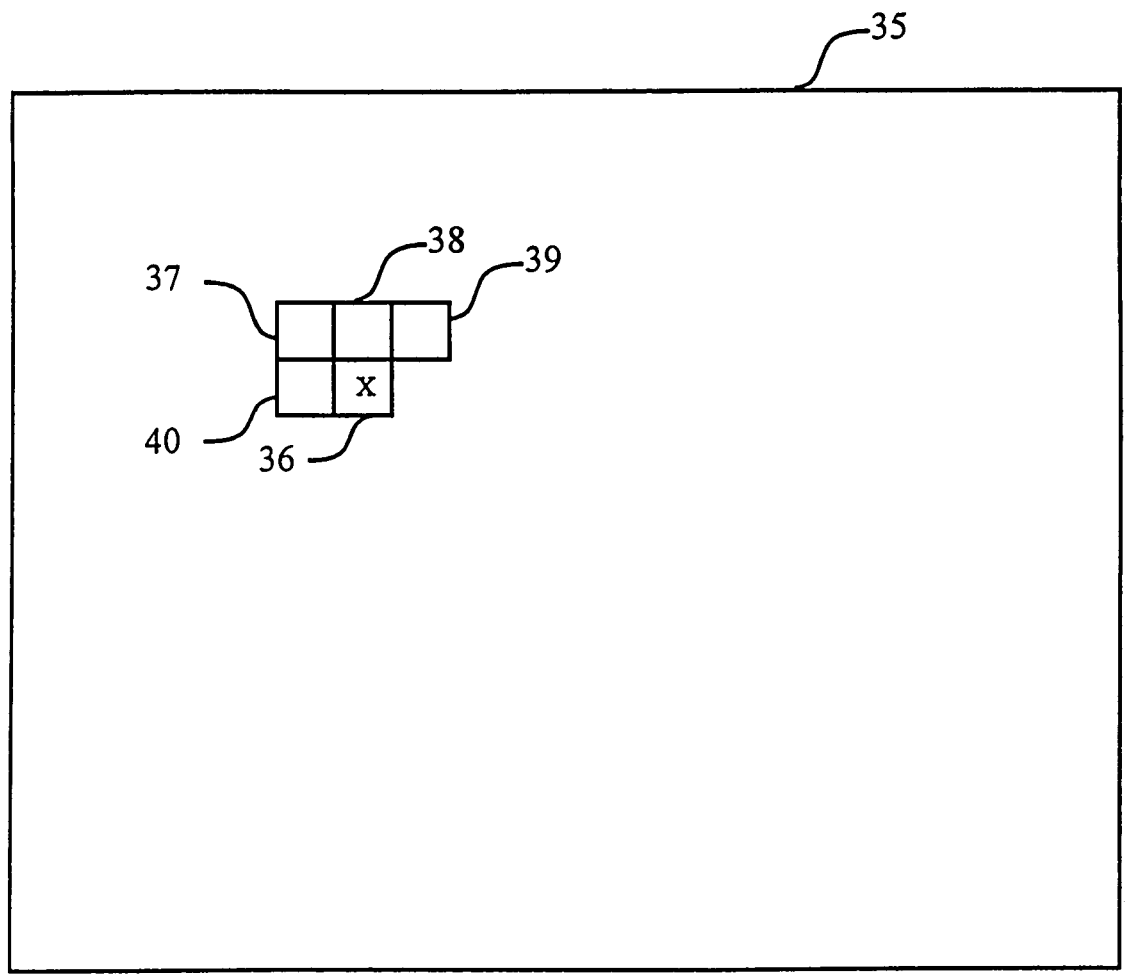
FIG. 7 illustrates the process of utilising a surrounding context for a current coefficient in accordance with the first preferred embodiment.

Turning to FIG. 7, a subband eg. 35 is coded in raster scan order from top to bottom and left to right. If the current coefficient to be coded is marked with a cross 36, the surrounding coefficients are considered to be the four surrounding coefficients indicated by the four empty squares 37–40. The surrounding coefficients are selected by a window with a shape as indicated in FIG. 7. If the cross in the window is aligned with the current coefficient the surrounding coefficients 37–30 are defined to be the coefficients that fall within the window.

The window illustrated follows a raster scan order. Hence, when the current coefficient is being decoded the surrounding coefficients have already been decoded, and thus the decoder knows whether or not they are non zero. The context for the current pixel is determined by the number of surrounding coefficients 37–70 that are non-zero. In this case there are 5 contexts corresponding to 0, 1, 2, 3 or 4 surrounding pixels that are non-zero. For the coefficients in the first row or column a modified window is used that includes only coefficients in the current subband.

Obviously different windows can be used. Ideally, the surrounding coefficients must come before the current coefficient in the raster scan order. This is so the decoder knows their value before decoding the current pixel. The four coefficient window of FIG. 7 has been selected for a good compromise between complexity, which grows with the number of contexts, and compression efficiency, which increases with the number of contexts, at least up to a certain point.

1.3 Context Entropy Coding

As noted previously, the number of leading zeros Z of each coefficient is coded with a context based entropy coder. Preferably, this is a standard arithmetic coder. Arithmetic coding is described in Witten et. al., "Arithmetic coding for data compression", Communications of the ACM, Volume 30, No. 6, June 1987. Preferably fixed histograms are utilised. The histograms are then coded into the compressed image header and are used by the decoder.

Figure 8:
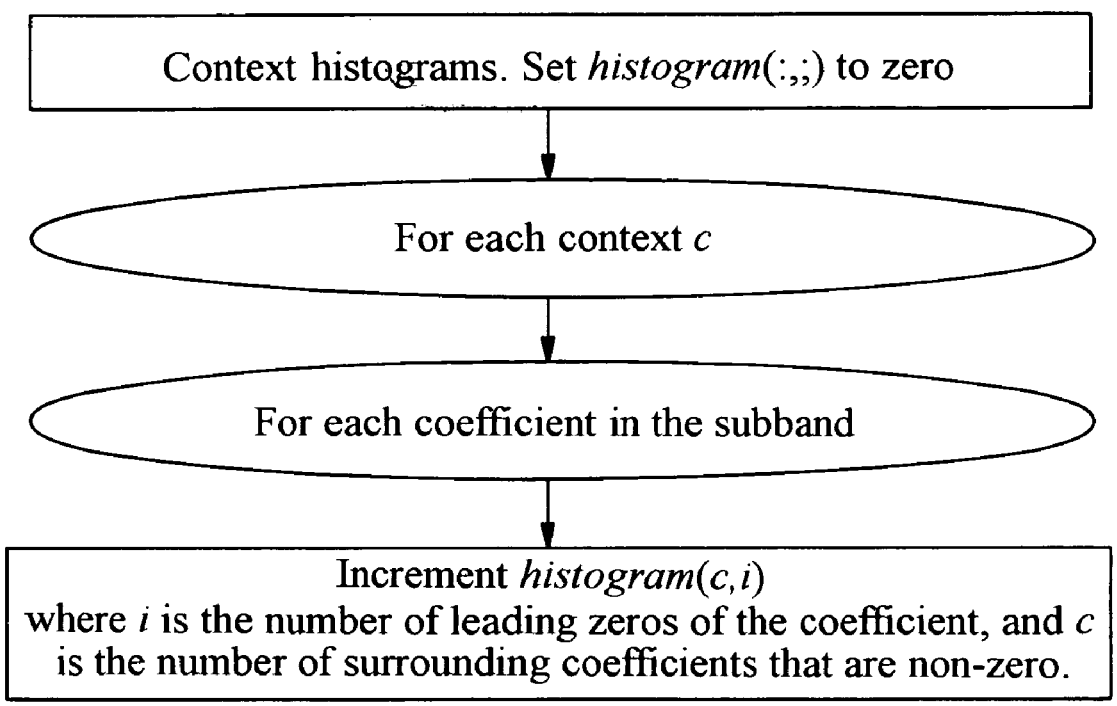
FIG. 8 illustrates the process of histogram calculation for each subband.

In the preferable implementation the arithmetic coder is initialised with different histograms for each subband. For a given subband a histogram with 16 bins is generated for each context as illustrated in FIG. 8. For a given context the $i^{th}$ bin of the histogram is the count of the number of coefficients with i leading zeros and whose context of surrounding coefficients is the given context. For example, for a context of 2 surrounding non-zero, coefficients, bin 7 of the histogram is the count of the number of coefficients with 7 leading zeros and who have 2 surrounding non-zero pixels.

These histograms are made prior to the coding process. As an alternative an adaptive arithmetic coder could be utilised.

At the decoder these histograms are used to decode the leading zero information for the subband coefficients, which is contained in the coded bit stream. For the non-zero coefficients, the remaining bits and sign bit are read from the coded bit stream and hence the quantised coefficients can be constructed.

2.0 Second Preferred Embodiment

In the second preferred embodiment, an effective compression of the subbands is also provided through the utilisation of relationship between the energy of adjacent coefficients in the DWT subband.

The encoding proceeds via a depth first approach. That is, each bit of a current coefficient is encoded, based on the context of bits, of previously coded surrounding coefficients, on a current bit-plane (bit-plane number n) and on whether or not a most significant bit (msb)of the current coefficient has been coded (ie. the msb number is greater than bit-plane n). By using a limited window a number contexts used in the encoding takes on a relatively small range of values, and hence there are a limited number of contexts. For efficient entropy coding such a small number of contexts is desired. After substantially all the bits of the current coefficient are encoded, a sign (positive "+" or negative "−") of the current coefficient, if the current coefficient is not zero, is transmitted or encoded as is. Optionally entropy coding of a sign of the coefficient could also be used at this stage.

Figure 9:
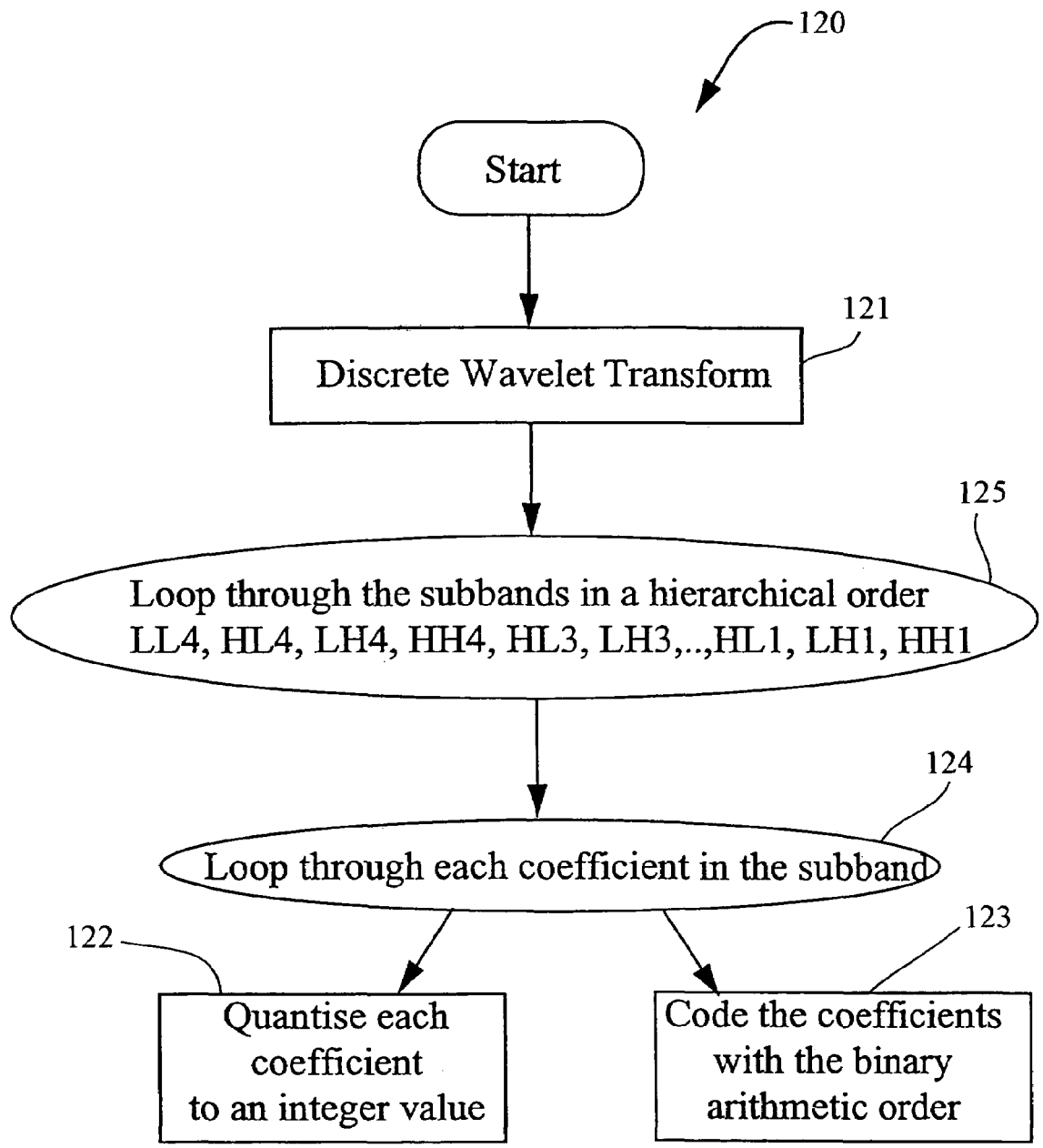
FIG. 9 illustrates the steps involved in the encoder of the second preferred embodiment.
Figure 10:
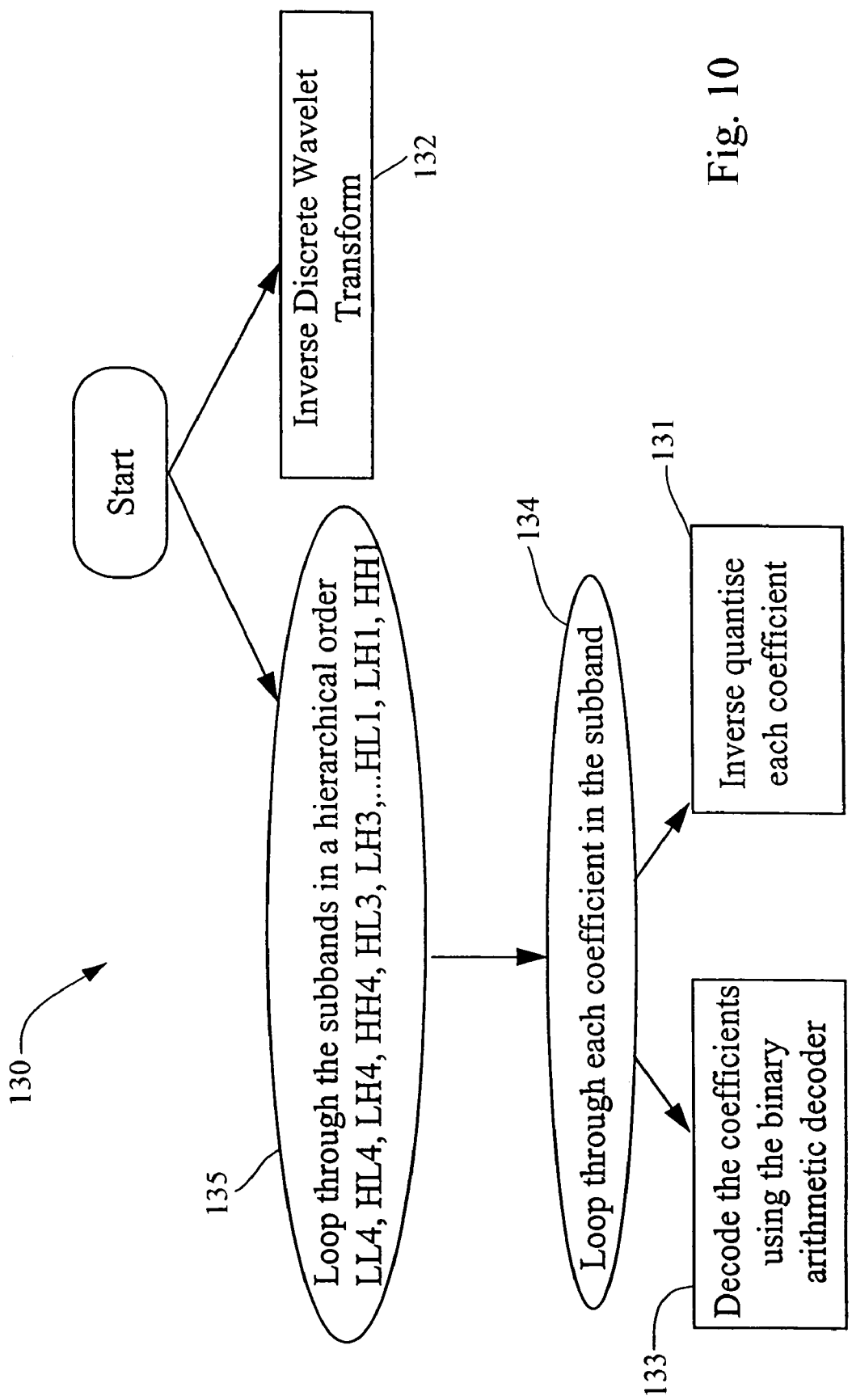
FIG. 10 illustrates the steps in the decoder as constructed in accordance with the second preferred embodiment.

An overview of the coding process is illustrated 120 in FIG. 9, while the decoding process is illustrated 130 in FIG. 10, in the form of structure diagrams. Typically structure diagrams a read with a left operation item begin performed before a right operation item.

Figure 11:
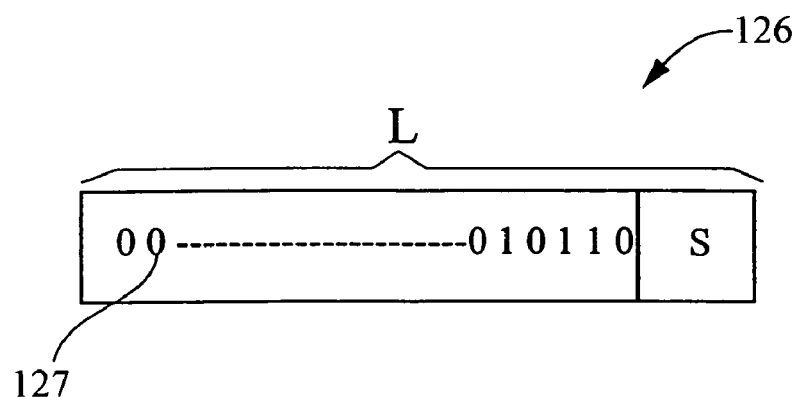
FIG. 11 illustrates a data structure utilised by the second preferred embodiment.

Turning initially to FIG. 9, a digital image is transformed 121 using a Discrete Wavelet Transform into several subband components as previously described. Each subband is preferably coded in a hierarchical order. An encoding coding of the transform coefficients is performed 143 by a binary arithmetic coder. Each coefficient 144 in each subband 145 is iteratively processed by a quantisation 122 then an entropy coding by a binary arithmetic coder 143. As illustrated in FIG. 11, each coefficient in a subband is quantised to an integer value 125 having a predetermined number of bits L, and conceptually represented in a binary format with a sign bit s. Each bit 161 is preferably coded in order from a most significant bit-plane to a least significant bit-plane. A bit 161 of the integer value 125 is entropy coded using a context formed from a consideration of surrounding bits, and whether or not a msb of the integer value 125 has been entropy coded.

As illustrated in FIG. 10, at the decoder the operation of the encoder is reversed (in as much as this is possible with quantisation). A predetermined portion of an encoded bitstream (the result of the coder) is decoded 150 by a binary arithmetic decoder to provide a quantised coefficient. The quantised coefficient is inverse quantised 131. This process is looped through 151,152 in an, iterative manner, to produce each coefficient of each subband. Finally an inverse Discrete Wavelet Transform is performed 132 on the resulting subbands to give the output image. This process need not be iterative. For example, the entire bitstream can be encoded by the binary arithmetic decoder 133 to provide substantially all the quantised coefficients and then these coefficients can be inverse quantised 31 before applying the inverse Discrete Wavelet Transform 132.

As noted previously, in the encoding process the discrete wavelet transform coefficients are quantised 122 to integer values. Let c represent a coefficient value and d its quantised values. Then the quantisation is performed as, $$d = \text{fix}\left(\frac{c}{q}\right)$$

where q is a predetermined quantisation factor and fix is defined by, $$\text{fix}(x) = \begin{cases} \lfloor x \rfloor & x \geq 0 \\ \lceil x \rceil & x \leq 0 \end{cases}$$

were $\lfloor \ \rfloor$ is the round down to nearest integer operator and $\lceil \ \rceil$ is the round up to nearest integer operator. At the encoder each coefficient in a subband is quantised to an integer value using this equation.

The inverse quantisation is given by $$c = q \times d + \text{sign}(d) \times \frac{q}{2}$$

where, $$\text{sign}(d) = \begin{cases} -1 & d \leq 0 \\ 0 & d = 0 \\ 1 & d \geq 0 \end{cases}$$

At the decoder each coefficient is inverse quantised using this inverse quantisation equation. The quantisation factor q can vary from subband to subband, or it can be fixed for the whole image. It can be coded in the header of the compressed image.

2.1 Coefficient Coding and Decoding

As shown in FIG. 11, each quantised coefficient is an integer value represented in a binary format with a sign bit. For the purpose of the description of the preferred embodiment, it is assumed with 15 bits and an extra sign bit (ie. L=16)). Thus $$d = \text{sign}(d) \times b_{14} b_{13} \ldots b_0$$

where $b_n$ is binary bit n.

The coefficient d is coded by entropy coding the bits $b_{14}$, $b_0$ in order, and a sign bit for non-zero coefficients. Bit $b_n$ of a coefficient is coded with a binary entropy coder (eg. binary arithmetic coder) based on the context determined by a bit pattern formed from: bit n of each of the surrounding coefficients; whether the most significant bit of a current coefficient has been coded (ie whether the msb number is greater than n); and on whether the msb of any of the surrounding coefficients have been coded. A description of surrounding coefficients and context thus formed is given below. A sign of each coefficient not quantised to zero can be coded as is or entropy coded based on surrounding coefficient signs.

At the decoder the quantised coefficient d is reconstructed by simply entropy (eg. binary arithmetic) decoding bits $b_{14}, \ldots b_0$ and a sign bit for non-zero coefficients.

2.2 Surrounding Coefficient Context

Figure 12:
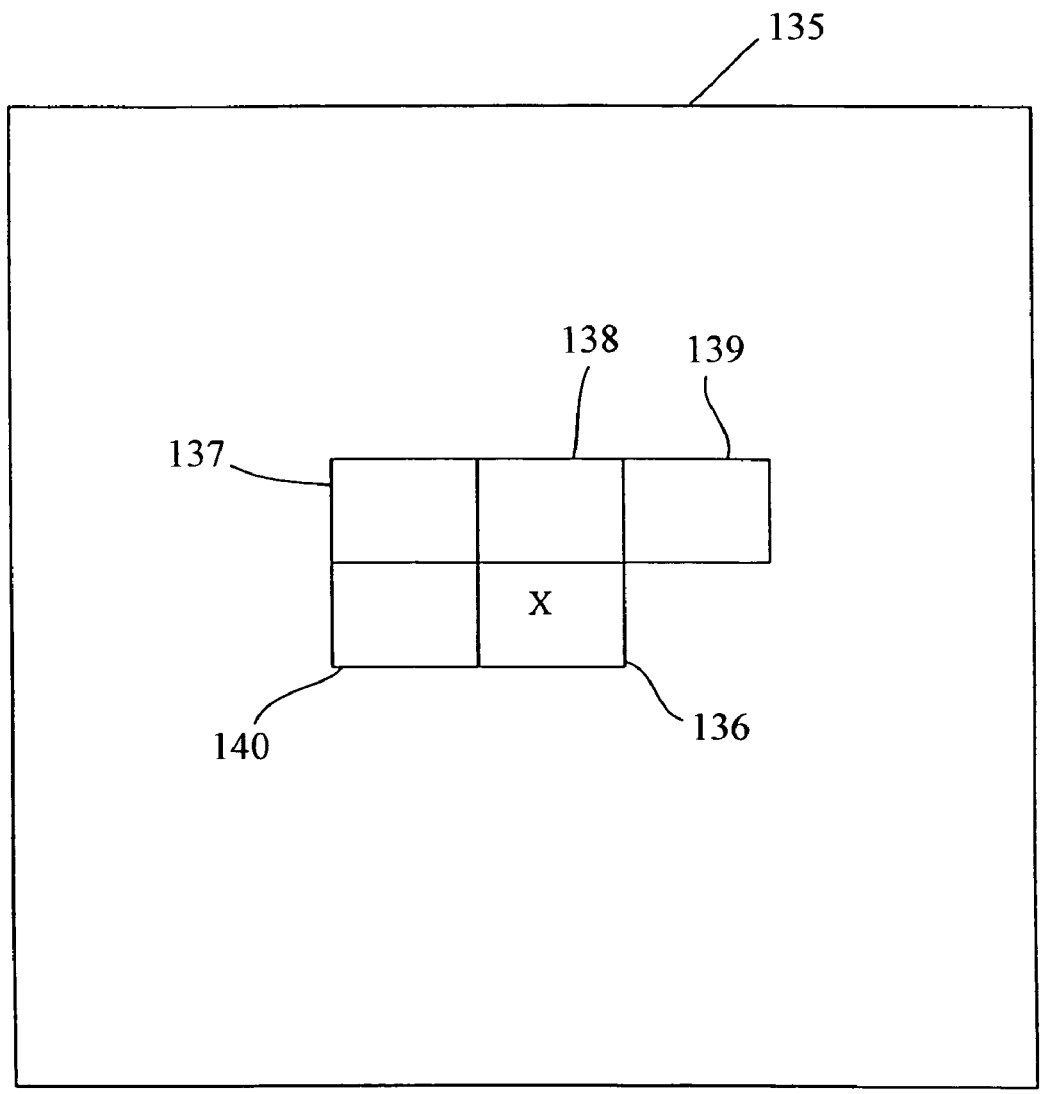
FIG. 12 illustrates a window for determining a context for a current coefficient in accordance with the second preferred embodiment.

Turning to FIG. 12, a subband eg. 135 is coded in raster scan order from top to bottom and left to right. If the current coefficient to be coded is marked with a cross 136, the surrounding coefficients are considered to be the four surrounding coefficients indicated by the four empty squares 137–140. Preferably the surrounding coefficients are selected by a window with a shape as indicated in FIG. 12. If the cross in the window is aligned with the current coefficient the surrounding coefficients 137–140 are defined to be the coefficients that fall within the window.

The window illustrated follows a raster scan order. Hence, when the current coefficient is being decoded the surrounding coefficients have already been decoded, and thus the decoder knows whether or not they are non zero.

Referring to FIG. 13, there is shown a single bit-plane 150, bit-plane n, of the DWT coefficients. The window, described with reference to FIG. 12, includes four bits at bit-plane n labelled $c_2 \ldots c_5$ of surrounding coefficients 142–145. Preferably additional flags other than the surrounding bits $c_2 \ldots c_5$, are used to determine a context. The additional flags can include a flag, $c_0$, that indicates whether or not a current coefficient 141 has a msb that has been previously entropy coded, and/or a flag, $c_1$, indicating whether or not any the surrounding coefficients have a msb which has been previously entropy coded. That is, if encoding the coefficient is performed from a highest value bit-plane to a lowest value bit-plane than $c_0$ represent whether or not there is a set (1) bit of a current coefficient in bit-planes above the current bit-plane, and $c_1$ represent whether or not there is a set (1) bit on any of the surrounding coefficient 142–145 in bit-planes above or in the current bit-plane.

A context for bit n of the current coefficient 141 is determined, in the second preferred embodiment, by 6 bit binary number $c_0, c_1, c_5$. Bit $c_0$ of the context is set (ie has value 1) if the most significant bit (msb) of the current coefficient has already been coded. That is the msb of the current coefficient is in bit plane n+1 or greater. Bit $c_1$ is set if any one of the four surrounding coefficients 142–145 has a msb in bit plane n or greater. Finally bits $c_2, c_3, c_4$ and $c_5$ are determined by a bit pattern of the four surrounding coefficients 142–145. In this case, for example, there are $2^6 = 64$ contexts, since there are 64 different permutations of binary bits $c_0, c_1, c_5$.

The context formation described above is causal in that the context can be formed from previously coded information. In this manner the decoder can form the same context as the encoder. For the window in FIG. 13, following the raster scan order 146, when bit n of the current coefficient is being decoded the surrounding coefficients 142–145 have already been decoded, and thus the decoder knows bit n for each of these coefficients, 142–145, and whether or not the msb of these coefficients is in a bit-plane greater than or equal to bit-plane n. The decoder also knows whether the msb of the current coefficient is in a bit-plane greater than or equal to bit-plane n+1. Thus the decoder can form the same context as used at the encoder.

Optionally different windows and different information about previously coded bits in coefficients can be used to form a variety of different sets of contexts without departing from the scope and spirit of the invention. For example another window configuration can be used to determine a context. Typically information used to determine a context is causal. That is, surrounding coefficients (or bits) used in the determination of the context are to be processed before a current coefficient. Preferably in a raster scan (or coding) order. A small local window is also desired because it minimises the local memory buffering requirements. In addition, a small number of contexts is preferred to minimise the amount of memory required for the entropy coding, and to prevent context dilution. The four coefficient window, and whether or not the msb has been coded, is used, herein, as a good compromise between complexity, which grows with the number of contexts, and compression efficiency, which increases with the number of contexts, at least up to a predetermined number of such contexts.

Typically, once the most significant bit of a coefficient has been coded, a different context entropy coder could be used: one that is based more on the current coefficient to be coded than on the surrounding coefficients. Optionally, it is possible to simple code these bits without entropy coding.

2.3 Context Entropy Coding

As noted previously, each bit of a current coefficient is coded with a context based entropy coder. Preferably, this is a standard arithmetic coder. Arithmetic coding is described in Witten et. al., "Arithmetic coding for data compression", Communications of the ACM, Volume 30, No. 6, June 1987.

Typically Arithmetic coding relies on assigning a probability of occurrence of a symbol, in a plurality of symbols to be encoded. Hence one option of the preferred embodiment is to assign a predetermined probability to each of the 64 different contexts, preferably so that each context has a probability value indicative of a likelihood that a current symbol has a resulting value. The contexts and their corresponding probabilities form a look up table that is duplicated for a decoder, so the decoder can mimic the encoder. Naturally, a fixed probability approach works well on stationary images but in reality not all images are stationary and while a performance of the encoder/decoder is adequate, using a fixed probability approach, both for stationary and non-stationary sources an adaptive arithmetic coder is preferred. For non-stationary sources (images) an adaptive arithmetic (de)coder will overcome changes in the probability distribution of each symbol.

Another embodiment of the present invention can be described as a variation on the second preferred embodiment in which a combination of a breadth first and a depth first approach is adopted. In the present embodiment an image is, transformed, quantised and divided into a plurality of blocks. Preferably each block including a fixed number of quantised transformed coefficients. A predetermined block of transformed coefficients is processed in a breadth first manner. That is, each coefficient in the block and each symbol of each coefficient is processed in a sequential manner. For example a first symbol of a first coefficient is encoded substantially as described in the preferred embodiment, then a first symbol of a second coefficient is encoded, then a first symbol of a third coefficient is encoded etc. Until all first symbols of the coefficients in the block have been encoded. Next all the second symbols of each coefficient in the block are encoded. This is continued across (breadth first) each coefficient in the block until substantially all coefficients and their corresponding symbols have been encoded. Another block of coefficients is then processed in a substantially similar manner until substantially all the blocks and hence substantially all coefficients of the transformed image are encoded.

Essentially, the depth first approach upon each transform coefficient described, above, with reference to the second preferred embodiment is adopted on a block by block basis. However, the coefficients within each block are encoded in a breadth first approach.

Figure 14:
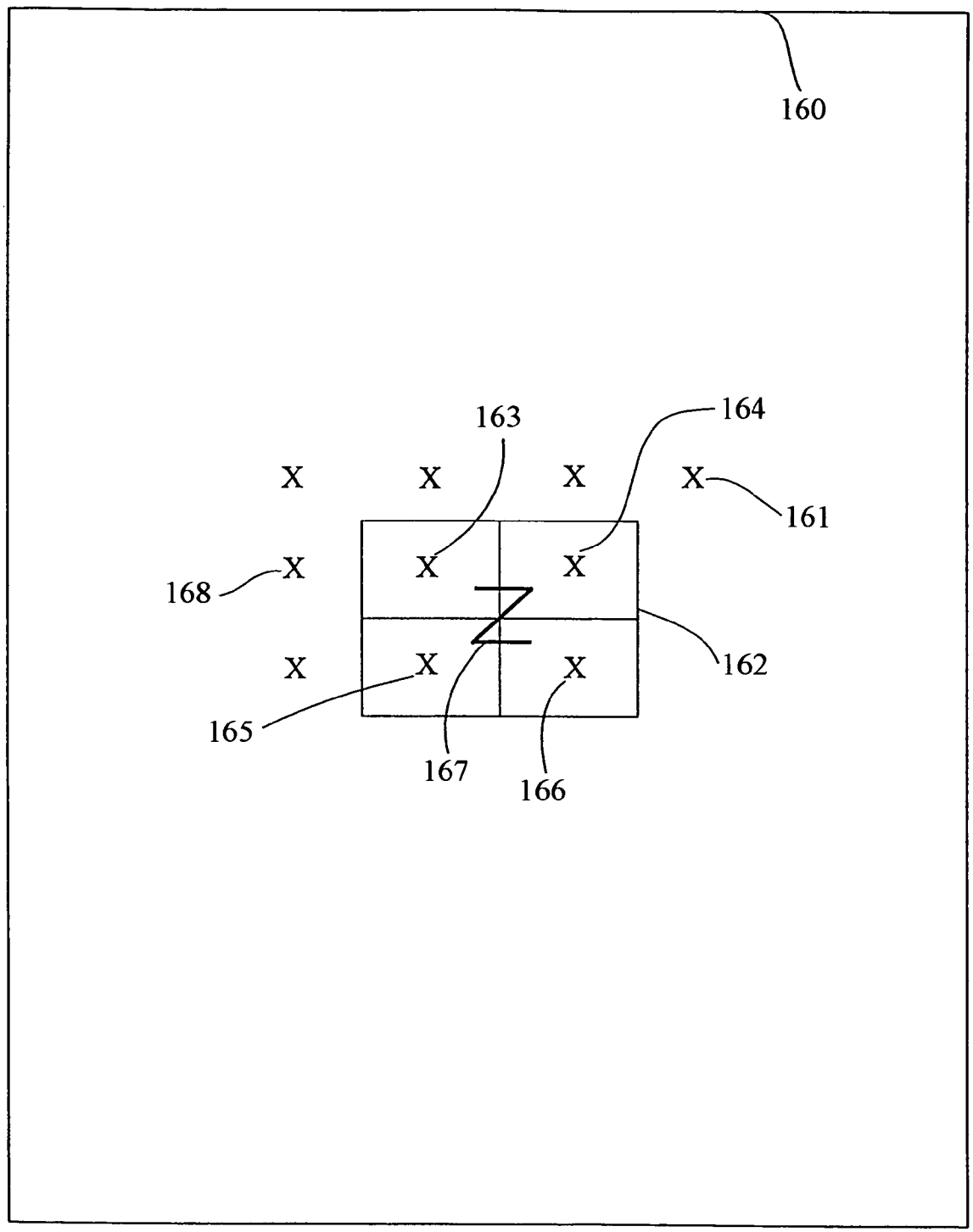
FIG. 14 illustrates the process of block based encoding in accordance with a further embodiment of the invention.

Referring to FIG. 14, there is shown an array 160 of transform coefficients 161, representing a set of quantised transform coefficients 161 of an image. The array 160 of coefficients 161 are divided into a plurality of blocks and an example of one such block 162 is also shown in FIG. 14. The block 162 is a 2×2 block including four coefficients 163–166 which are typically encoded on a symbol by symbol basis in a zigzag fashion 167. That is, a first symbol of the first coefficient 163 of the block 162 is encoded based on a context determined for the first symbol substantially as described in the second preferred embodiment. Next a first symbol of the second coefficient 164 of the block 162 is encoded. Followed by an encoding of a first symbol of the third coefficient 165 of the block 162 and similarly a first symbol of the fourth coefficient 166 is encoded. Next a second symbol of all the coefficients 163–166, of the block 162, are encoded in substantially the same manner. This is repeated until substantially all symbols of the coefficient of the block 162 are encoded before another block is encoded.

A determination of an ideal block size (ie. the number of coefficients per block) may vary from application to application and/or an amount of available high speed cache memory, however a preferred block size is one than exploits both advantages of a depth first approach and a breadth first approach. Advantages of the breadth first approach include having knowledge of previously encoded symbols of an entire block. For example, as noted previously, once all the first symbols of each coefficients of a block is encoded a context of second symbols of each coefficient can benefit from a knowledge of the first symbols encoded across the entire block. Advantages of a depth first approach include on each block is that an array of coefficients can be read on a block by block basis rather than a symbol by symbol basis required in a purely breadth first approach, thus reduce the number of accesses to the array.

Typically, the array 160 of coefficients is stored in memory such as RAM or on external memory such as a hard disk drive for example. Access time for such memory read and/or writes is typically long when compared to on processor cache memory. Consequently, increased performance can be had by caching the block 162 in local cache (high speed) memory rather than access coefficients from the array 160 stored in a hard disk drive or lower performance memory. Images are generally large with respect to the number of bytes per file when compared to, for instance, a text file and hence it is not unreasonable to store a library of images on a hard disk drive. The method of the present embodiment therefore reduces the number of accesses to the array 160 stored in external memory than the number of accesses of a purely breadth first approach. Thus improving performance without the need to cache substantially the entire array 160.

A context of a current symbol in the block based coding technique of the present embodiment is determined substantially as hereinbefore described with reference to the preferred embodiment. Thus in addition to caching the block 162, surrounding coefficients 168 are also cached. Naturally, the number of coefficients 168 and which coefficients are to be cached, in addition to the block 162, depends upon a choice of window and/or flag bits for determining a context.

The preferred embodiments also have application to other image formats. For example, full colour images can be encoded via separate colour channels or the usual chrominance compression techniques as utilised in the JPEG standard can be applied so as to produce reduced chrominance data. Further, the preferred embodiments are described with reference to binary symbols (ie 1 or 0) and bitplanes, however the embodiments, ie the depth first approach, can also be implemented with a n-ary representation of coefficients. That is, each coefficient can be represented by a plurality of different symbols (ie. N symbols for an n-ary representation). Still further, not all symbols of a current coefficient need be encoded before encoding a next coefficient. For example, in an eight bit representation of coefficients, four bits of each coefficient can be encoded on each pass (raster scan). Hence in two passes of memory each coefficient will be encoded.

Additionally, the principles of the preferred embodiments can be equally extended to other forms of data such as sound data etc. and the preferred embodiments have application wherever wavelet transforms are suitable. Additionally, the preferred embodiments can be applied to other forms of transformed data for example, the discrete cosine transform process in addition to the wavelet packet and cosine packet transform techniques as described in the aforementioned survey article.

3.1 Preferred Embodiment of Apparatus(s)

Figure 15:
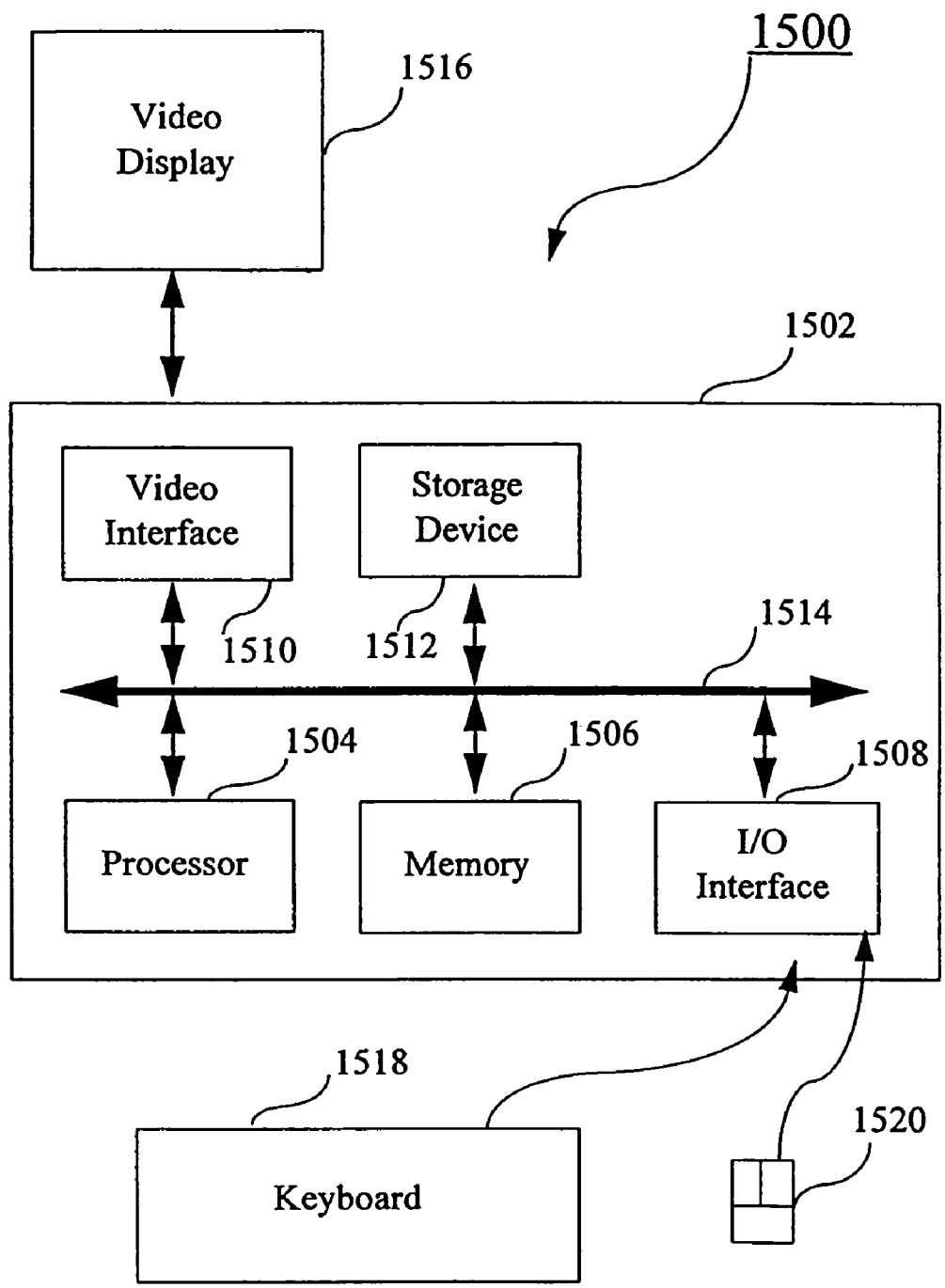
FIG. 15 is a block diagram of a general purpose computer.

The encoding and/or decoding process are preferably practiced using a conventional general-purpose computer, such as the one shown in FIG. 15, wherein the processes of FIG. 4 to 14 may be implemented as software executing on the computer. In particular, the steps of the encoding and/or decoding methods are effected by instructions in the software that are carried out by the computer. The software may be divided into two separate parts; one part for carrying out the encoding and/or decoding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding and/or decoding representations of digital images in accordance with the embodiments of the invention.

The computer system 1500 includes of the computer 1502, a video display 1516, and input devices 1518, 1520. In addition, the computer system 1500 can have any of a number of other output devices including line printers, laser printers, plotters, and other reproduction devices connected to the computer 1502. The computer system 1500 can be connected to one or more other computers via a communication interface 1508c using an appropriate communication channel 1530 such as a modem communications path, a computer network, or the like. The computer network may include a local area network (LAN), a wide area network (WAN), an Intranet, and/or the Internet The computer 1502 itself includes of a central processing unit(s) (simply referred to as a processor hereinafter) 1504, a memory 1506 which may include random access memory (RAM) and read-only memory (ROM), input/output (IO) interfaces 1508a, 1508b & 1508c, a video interface 1510, and one or more storage devices generally represented by a block 1512 in FIG. 15. The storage device(s) 1512 can include of one or more of the following: a floppy disc, a hard disc drive, a magneto-optical disc drive, CD-ROM, magnetic tape or any other of a number of non-volatile storage devices well known to those skilled in the art. Each of the components 1504 to 1512 is typically connected to one or more of the other devices via a bus 1514 that in turn can include of data, address, and control buses.

The video interface 1510 is connected to the video display 1516 and provides video signals from the computer 1502 for display on the video display 1516. User input to operate the computer 1502 can be provided by one or more input devices 1508*b*. For example, an operator can use the keyboard 1518 and/or a pointing device such as the mouse 1520 to provide input to the computer 1502.

The system 1500 is simply provided for illustrative purposes and other configurations can be employed without departing from the scope and spirit of the invention. Exemplary computers on which the embodiment can be practiced include IBM-PC/ATs or compatibles, one of the Macintosh (™) family of PCs, Sun Sparcstation (™), or the like. The foregoing is merely exemplary of the types of computers with which the embodiments of the invention may be practiced. Typically, the processes of the embodiments, described hereinafter, are resident as software or a program recorded on a hard disk drive (generally depicted as block 1512 in FIG. 15) as the computer readable medium, and read and controlled using the processor 1504. Intermediate storage of the program and pixel data and any data fetched from the network may be accomplished using the semiconductor memory 1506, possibly in concert with the hard disk drive 1512.

In some instances, the program may be supplied to the user encoded on a CD-ROM or a floppy disk (both generally depicted by block 1512), or alternatively could be read by the user from the network via a modem device connected to the computer, for example. Still further, the software can also be loaded into the computer system 1500 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of encoding and/or decoding may alternatively be implemented in dedicated hardware such as one or more integrated circuits performing the functions or sub functions of the encoding and/or decoding. Such dedicated hardware may include graphic processors, digital signal processors, or one or more microprocessors and associated memories.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

The invention claimed is:

1. A method of compressing data, wherein the data comprises a plurality of transform coefficients, and each transform coefficient is expressible in a format including a plurality of bit symbols, the format comprising a number of leading zero bit symbols and remaining bit symbols, the method comprising the steps of:
   (a) entropy encoding a number representative of the number of leading zero bit symbols of a current transform coefficient based on a context of a number of transform coefficients or part thereof surrounding the current transform coefficient, said context being based on the number of non-zero transform coefficients or part thereof surrounding the current transform coefficient;
   (b) coding the remaining bit symbols of the current transform coefficient; and
   (c) processing another transform coefficient, not previously coded, in accordance with steps (a) and (b).

2. A method as claimed in claim 1, further comprising the step of quantizing the transform coefficients.

3. A method as claimed in claim 1, wherein the representative number equals the number of leading zero bit symbols.

4. A method as claimed in claim 1, wherein said context is determined from an arrangement of surrounding transform coefficients.

5. A method as claimed in claim 4, wherein the surrounding transform coefficients are previously encoded transform coefficients.

6. A method as claimed in claim 1, wherein said step of coding the remaining bit symbols includes copying the remaining bit symbols.

7. A method as claimed in claim 1, wherein said entropy encoding is performed by an arithmetic coder.

8. A method as claimed in claim 1, further comprising the step of Discrete Wavelet Transforming data to produce the plurality of transform coefficients.

9. A method of compressing data, wherein the data comprises a plurality of transform coefficients, and each transform coefficient is expressible in a format comprising a plurality of bit symbols, the method comprising the steps of:
   (a) entropy encoding one of the bit symbols, not previously entropy coded, of a current transform coefficient based on a context of a number of surrounding bit symbols and on whether or not the most significant bit symbol of the current coefficient has been previously entropy coded, said context being based on the number of non-zero transform coefficients surrounding the current transform coefficient;
   (b) repeating step (a) a predetermined number of times for the current transform coefficient; and
   (c) processing another transform coefficient, not previously entropy coded, in accordance with steps (a) and (b).

10. A method as claimed in claim 9, further comprising the step of quantizing the transform coefficients.

11. A method as claimed in claim 9, wherein said context of surrounding bit symbols includes information as to whether or not a most significant bit of at least one transform coefficient spatially adjacent, to the current transform coefficient, has been encoded.

12. A method as claimed in claim 9, wherein the transform coefficients are represented in a bit-plane representation and the surrounding bit symbols are bit symbols in a current bit-plane.

13. A method of decompressing data, wherein the data once decompressed comprises a plurality of transform coefficients, and each transform coefficient is expressible in a format including a plurality of bit symbols, the format comprising a number of leading zero bit symbols and remaining bit symbols, the method comprising the steps of:
   (a) entropy decoding an encoded number representative of the number of leading zero bit symbols of a current transform coefficient based on a context of a number of transform coefficients or part thereof surrounding the current transform coefficient, said context being based on the number of non-zero transform coefficients or part thereof surrounding the current transform coefficient;

(b) decoding the remaining bit symbols of the current transform coefficient; and (c) generating another transform coefficient in accordance with steps (a) and (b).

14. A method as claimed in claim 13, further comprising the step of inverse quantizing the transform coefficients.

15. A method as claimed in claim 13, wherein the representative number equals the number of leading zero bit symbols.

16. A method as claimed in claim 13, wherein said context is determined from an arrangement of surrounding transform coefficients.

17. A method as claimed in claim 16, wherein the surrounding transform coefficients are previously decoded transform coefficients.

18. A method as claimed in claim 13, wherein said step of decoding the remaining bit symbols includes copying the remaining bit symbols.

19. A method as claimed in claim 13, wherein said entropy decoding is performed by an arithmetic coder.

20. A method as claimed in claim 13, wherein further comprising the step of inverse Discrete Wavelet Transforming the transform coefficients.

21. A method of decompressing data, wherein the data once decompressed comprises a plurality of transform coefficients, and each transform coefficient is expressible in a format comprising a plurality of bit symbols, the method comprising the steps of:

(a) entropy decoding an encoded bit symbol of a current transform coefficient based on a context of a number of surrounding bit symbols and on whether or not the most significant bit symbol of the current coefficient has been previously entropy decoded, said context being based on the number of non-zero transform coefficients surrounding the current transform coefficient;

(b) repeating step (a) a predetermined number of times for the current transform coefficient; and (c) generating another transform coefficient in accordance with steps (a) and (b).

22. A method as claimed in claim 21, further comprising the step of inverse quantizing the transform coefficients.

23. A method as claimed in claim 21, wherein said context of surrounding bit symbols includes information as to whether or not a most significant bit of at least one transform coefficient spatially adjacent, to the current transform coefficient, is encoded or decoded.

24. A method as claimed in claim 21, wherein the transform coefficients are represented in a bit-plane representation and the surrounding bit symbols are bit symbols in a current bit-plane.

25. An apparatus for compressing data, wherein the data comprises a plurality of transform coefficients and each transform coefficient is expressible in a format including a plurality of bit symbols, the format comprising a number of leading zero bit symbols and remaining bit symbols, the apparatus including:

first encoder means for entropy encoding a number representative of the number of leading zero bit symbols of a current transform coefficient based on a context of a number of transform coefficients or part thereof surrounding the current transform coefficient, said context being based on the number of non-zero transform coefficients or part thereof surrounding the current transform coefficient; and second encoder means for encoding the remaining bit symbols of the current transform coefficient; and processor means for processing another transform coefficient, not previously coded, in accordance with the operations of the first and second encoder means.

26. An apparatus according to claim 25, wherein the apparatus further includes quantization means for quantizing the transform coefficients.

27. An apparatus as claimed in claim 25, wherein the representative number equals the number of leading zero bit symbols.

28. An apparatus as claimed in claim 25, wherein said context is determined from an arrangement of surrounding transform coefficients.

29. An apparatus as claimed in claim 28, wherein the surrounding transform coefficients are previously encoded transform coefficients.

30. An apparatus as claimed in claim 25, wherein said second encoder means codes the remaining bit symbols by copying the remaining bit symbols.

31. An apparatus as claimed in claim 25, wherein said first encoder means is an arithmetic coder.

32. An apparatus as claimed in claim 25, wherein said apparatus further includes a transform means for Discrete Wavelet Transforming data to produce the plurality of transform coefficients.

33. An apparatus for compressing data, wherein the data comprises a plurality of transform coefficients, and each transform coefficient is expressible in a format comprising a plurality of bit symbols, the apparatus including:

entropy encoder means for entropy encoding one of the bit symbols, not previously entropy coded, of a current transform coefficient based on a context of a number of surrounding bit symbols and on whether or not the most significant bit symbol of the current coefficient has been previously entropy encoded, said context being based on the number of non-zero transform coefficients surrounding the current transform coefficient;

repetition means for repeating the operation of the entropy encoder a predetermined number of times for the current transform coefficient; and processor means for processing another transform coefficient in accordance with the operations of the entropy encoder means and repetition means.

34. An apparatus as claimed in claim 33, wherein the apparatus includes quantizing means for quantizing the transform coefficients.

35. An apparatus as claimed in claim 33, wherein said context of surrounding bit symbols includes information as to whether or not a most significant bit of at least one transform coefficient spatially adjacent, to the current transform coefficient, has been encoded.

36. An apparatus as claimed in claim 33, wherein the transform coefficients are represented in a bit-plane representation and the surrounding bit symbols are bit symbols in a current bit-plane.

37. An apparatus for decompressing data, wherein the data once decompressed comprises a plurality of transform coefficients and each transform coefficient is expressible in a format comprising a plurality of bit symbols, the format comprising a number of leading zero bit symbols and remaining bit symbols, the apparatus including:

first decoder means for entropy decoding an encoded number representative of the number of leading zero bit symbols of a current transform coefficient based on a context of a number of transform coefficients or part thereof surrounding the current coefficient, said context being based on the number of non-zero transform coefficients or part thereof surrounding the current transform coefficient;

second decoder means for decoding the remaining bit symbols of the current transform coefficient; and generator means for generating another transform coefficient in accordance with the operations of the first and second decoder means.

38. An apparatus as claimed in claim 37, further comprising inverse quantization means for inverse quantizing the transform coefficients.

39. An apparatus as claimed in claim 37, wherein the representative number equals the number of leading zero bit symbols.

40. An apparatus as claimed in claim 37, wherein said context is determined from an arrangement of surrounding transform coefficients.

41. An apparatus as claimed in claim 40, wherein the surrounding transform coefficients are previously decoded transform coefficients.

42. An apparatus as claimed in claim 37, wherein said second decoder means decodes the remaining bit symbols by copying the remaining bit symbols.

43. An apparatus as claimed in claim 37, wherein said first decoder means is an arithmetic coder.

44. An apparatus as claimed in 37, wherein said apparatus further includes an inverse transform means for inverse Discrete Wavelet Transforming the transform coefficients.

45. An apparatus for decompressing data, wherein the data once decompressed comprises a plurality of transform coefficients, and each transform coefficient is expressible in a format comprising a plurality of bit symbols, the apparatus including:

entropy decoder means for entropy decoding an encoded bit symbol of a current transform coefficient based on a context of a number of surrounding bit symbols and on whether or not the most significant bit symbol of the current coefficient has been previously entropy decoded, said context being based on the number of non-zero transform coefficients surrounding the current transform coefficient;

repetition means for repeating the operation of the entropy decoder means a redetermined number of times for the current transform coefficient; and generation means for generating another transform coefficient in accordance with the operation of the entropy decoder means and the repetition means.

46. An apparatus as claimed in claim 45, wherein the apparatus includes inverse quantization means for inverse quantizing the transform coefficients.

47. An apparatus as claimed in claim 45, wherein said context of surrounding bit symbols includes information as whether or not a most significant bit of at least one transform coefficient spatially adjacent, to the current transform coefficient, is encoded or decoded.

48. An apparatus as claimed in claim 45, wherein the transform coefficients are represented in a bit-plane representation and the surrounding bit symbols are bit symbols in a current bit-plane.

49. A computer readable storage medium encoded with a computer program for compressing data, wherein the data comprises a plurality of transform coefficients, and each transform coefficient is expressible in a format including a plurality of bit symbols, the format comprising a number of leading zero bit symbols and remaining bit symbols, the computer program comprising:

first encoder means for entropy encoding a number representative of the number of leading zero bit symbols of a current transform coefficient based on a context of a number of transform coefficients or part thereof surrounding the current transform coefficient, said context being based on the number of non-zero transform coefficients or part thereof surrounding the current transform coefficient;

second encoder means for encoding the remaining bit symbols of the current transform coefficient; and processor means for processing another transform coefficient, not previously coded, in accordance with the operations of the first and second encoder means.

50. A computer readable storage medium encoded with a computer program for compressing data, wherein the data comprises a plurality of transform coefficients and each transform coefficient is expressible in a format comprising a plurality of bit symbols, the computer program comprising:

entropy encoder means for entropy encoding one of the bit symbols, not previously entropy coded, of a current transform coefficient based on a context of a number of surrounding bit symbols and on whether or not the most significant bit symbol of the current coefficient has been previously entropy encoded, said context being based on the number of non-zero transform coefficients surrounding the current transform coefficient;

repetition means for repeating the operation of the entropy encoder a predetermined number of times for the current transform coefficient; and processor means for processing another transform coefficient in accordance with the operations of the entropy encoder means and repetition means.

51. A computer readable storage medium encoded with a computer program for decompressing data, wherein the data once decompressed comprises a plurality of transform coefficients and each transform coefficient is expressible in a format comprising a plurality of bit symbols, the format comprising a number of leading zero bit symbols and remaining bit symbols, the computer program comprising:

first decoder means for entropy decoding an encoded number representative of the number of leading zero bit symbols of a current transform coefficient based on a context of a number of transform coefficients or part thereof surrounding the current coefficient, said context being based on the number of non-zero transform coefficients or part thereof surrounding the current transform coefficient;

second decoder means for decoding the remaining bit symbols of the current transform coefficient; and generator means for generating another transform coefficient in accordance with the operations of the first and second decoder means.

52. A computer readable storage medium encoded with a computer program for decompressing data, wherein the data once decompressed comprises a plurality of transform coefficients, and each transform coefficient is expressible in a format comprising a plurality of bit symbols, the computer program comprising:

entropy decoder means for entropy decoding an encoded bit symbol of a current transform coefficient based on a context of a number of surrounding bit symbols and on whether the most significant bit symbol of the current coefficient has been previously entropy decoded, said context being based on the number of non-zero transform coefficients surrounding the current transform coefficient;

repetition means for repeating the operation of the entropy decoder means a predetermined number of times for the current transform coefficient; and generation means for generating another transform coefficient in accordance with the operation of the entropy decoder means and the repetition means.

* * * * *

UNITED STATES PATENT AND TRADEMARK OFFICE
CERTIFICATE OF CORRECTION

PATENT NO. : 7,197,190 B1
APPLICATION NO. : 09/161770
DATED : March 27, 2007
INVENTOR(S) : James Philip Andrew It is certified that error appears in the above-identified patent and that said Letters Patent is hereby corrected as shown below:

COLUMN 7:

Line 38, "were" should read --where--;
    Line 64, "(ie." should read --(i.e.--; and
    Line 65, "L = 16))." should read --L = 16).--.

COLUMN 8:

Line 8, "If" should read --if--; and
    Line 12, "for" should be deleted.

COLUMN 9:

Line 34, "a" (first occurrence) should read --are--, and "begin" should read --being--;
    Line 54, "(in as much" should read --(inasmuch--; and
    Line 59, "an," should read --an--.

COLUMN 10:

Line 19, "were" should read --where--.

COLUMN 11:

Line 29, "represent" should read --represents--;
    Line 31, "represent" should read --represents--; and
    Line 37, "(ie" should read --(i.e.--.

COLUMN 12:

Line 46, "is," should read --is--.

COLUMN 13:

Line 20, "are" should read --is--; and
    Line 31, "is" should read --are--, and "encoded a" should read --encoded, a--.

UNITED STATES PATENT AND TRADEMARK OFFICE
CERTIFICATE OF CORRECTION

PATENT NO. : 7,197,190 B1
APPLICATION NO. : 09/161770
DATED : March 27, 2007
INVENTOR(S) : James Philip Andrew It is certified that error appears in the above-identified patent and that said Letters Patent is hereby corrected as shown below:

COLUMN 14:

Line 4, "ie" should read --i.e.--;
    Line 5, "a" should read --an--;
    Line 7, "(ie." should read --(i.e.--; and
    Line 25, "process" should read --processes--.

COLUMN 16:

Line 27, "1," should read --in claim 1,--; and
    Line 52, "adjacent," should read --adjacent--.

COLUMN 17:

Line 26, "wherein" should be deleted; and
    Line 50, "adjacent," should read --adjacent--.

COLUMN 18:

Line 54, "adjacent," should read --adjacent--.

COLUMN 19:

Line 55, "as" should read --as to--; and
    Line 57, "adjacent," should read --adjacent--.

Signed and Sealed this

Eleventh Day of November, 2008

JON W. DUDAS
*Director of the United States Patent and Trademark Office*